United States Patent Office 3,303,231
Patented Feb. 7, 1967

3,303,231
MOLECULAR SIEVE SEPARATION PROCESSES
Clive Leonard Hicks and Robert Marshall Macnab, Sunbury-on-Thames, Middlesex, England, assignors to The British Petroleum Company Limited, London, England, a corporation of England
No Drawing. Filed Apr. 15, 1964, Ser. No. 360,075
Claims priority, application Great Britain, May 13, 1963, 18,840/63
6 Claims. (Cl. 260—676)

This invention relates to the separation of straight-chain hydrocarbons from hydrocarbon mixtures, particularly petroleum fractions, by means of 5 A. molecular sieves. More especially this invention is concerned with the separation of n-paraffin products of very high purity, i.e., greater than 99%, and, particularly, greater than 99.9% purity.

It is well known that certain natural and synthetic zeolites have the property of preferentially absorbing certain types of hydrocarbons. These zeolites, known as molecular sieves, have crystalline structures containing a large number of pores of uniform size. In different zeolites, these pores may vary from 4 A. to 15 A. or more in diameter, but in any one zeolite the pores will be of substantially uniform size.

It had previously been proposed to treat petroleum fractions ranging from gasoline to gas-oils and higher with molecular sieves having pore diameters ranging from 4 A. to 15 A. In order to separate straight-chain hydrocarbons from branched-chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight-chain material may also be recovered as a product if desired. For example, a process suitable for separating normal paraffins from petroleum fractions boiling within the $C_{10}$–$C_{20}$ range is described in our co-pending U.S. patent application Serial No. 168,981, filed January 26, 1962, now U.S. Patent No. 3,201,490, said application corresponding to U.K. application No. 3965/61.

The above application describes an isothermal process comprising contacting a $C_{10}$–$C_{20}$ fraction with a 5 A. molecular sieve in a first stage to absorb straight chain hydrocarbons, contacting the sieve with a purging medium in a second stage to remove material adsorbed on the surface of the sieve or held interstitially between sieve particles, desorbing the absorbed hydrocarbons in a third stage using either n-butane or n-pentane as desorbing medium, all three stages being in the vapour phase, the pressure in the desorption stage being equal to, or greater than, the pressure in the absorption stage. Suitable absorption temperatures and pressures lie within the ranges 300–450° C. preferably 350–390° C., and 0–300 p.s.i.g., preferably 100–150 p.s.i.g.

In a process such as that described in our above-mentioned U.S. application it is possible to obtain a n-paraffin product of greater than 95% purity. For example, a straight-run petroleum fraction containing 22% weight of n-paraffins may be treated by the above process and a product containing 97% weight of n-paraffins recovered. While this is a relatively pure product for many purposes, if it is used as a feedstock for a subsequent process in which only partial reaction of n-paraffins takes place, thus necessitating recycle of unreacted n-paraffins, the quantity of non-paraffinic impurity in the feedstock will quickly build up. For example, if the process requires unreacted feedstock to be recycled at the rate of 50% weight and requires a n-paraffin feedstock purity of 90% weight minimum, if the original feedstock purity is 97% weight, the impurity will build up to more than the maximum 10% permissible after only five process cycles even allowing for a 50% make-up with 97% pure feedstock after each process cycle. If, however, a n-paraffin feedstock of 99.9% weight purity was employed, under the same conditions 198 process cycles could be performed before the purity of the feedstock dropped to the minimum 90% permissible.

According to the present invention a process for the production of n-paraffin fractions having a purity of at least 99% weight, preferably at least 99.9% weight, comprises treating a petroleum fraction in known manner such as that shown in our co-pending application Serial No. 168,981, now U.S. Patent No. 3,201,490, with a 5 A. molecular sieve to recover an intermediate product containing at least 90% and preferably at least 95%, weight of n-paraffins and reprocessing with a 5 A. molecular sieve to give a fraction containing less than 1%, preferably less than 0.1%, by weight of isoparaffins and naphthenes, wherein either the intermediate product or the low isoparaffin/naphthene fraction is dearomatized, and recovering a n-paraffin product having a purity of at least 99%, preferably at least 99.9%, by weight.

Although either the intermediate product or the reprocessed fraction may be dearomatized it is preferred to dearomatize the reprocessed fraction. Any suitable dearomatizing operation may be employed, for example, hydrogenation, adsorption on silica gel, alumina or bauxite, oleum washing being preferred, however.

It is common practice to improve the purity of a product by simply reprocessing it. In a molecular sieve separation process, however, this simple technique, although it would result in an improvement in purity, would not give a product of the required 99%+ purity. For example, in the process described in the above mentioned co-pending application it might be expected that the purity of the n-paraffin product would increase by a constant proportion on reprocessing so that if the first treatment of a feedstock containing 22% n-paraffins yielded a product containing 97% n-paraffins, reprocessing would be expected to yield a product containing 99.88% n-paraffins. This would be expected if the impurity is caused by traces of material of feed composition not removed from the sieve surface during the purge stage. In practice, however, the improvement in purity is not as great. This is due to the fact that some components of the feedstock, particularly aromatics, are selectively sorbed on the surface of the molecular sieve during the absorption stage and are not removed during the purge stage although they are removed with the product during the desorption stage. The impurity is not entirely due to this effect, however, otherwise reprocessing the product would give no improvement in purity whatever as the surface adsorption and desorption of aromatics would merely repeat itself. In fact the impurities in the n-paraffin product are partly due to this surface adsorption and partly due to hold-up of feed material between sieve particles. This is illustrated in Table 1 below:

*Table 1*

| Stream | Original Feedstock | Once-through Product | Reprocessed Product |
|---|---|---|---|
| Normal Paraffin Content, percent wt. | 21.7 | 93.1 | 98.8 |
| Total Impurity, percent wt. Proportional Reduction. | 78.3 | 6.9 ~11:1 | 1.2 ~6:1 |
| Total Aromatics, percent wt. Proportional Reduction. | 20.0 | 3.5 ~6:1 | 1.0 ~3:1 |
| Total Isoparaffins/Naphthenes, percent wt. | 58.3 | 3.4 ~17:1 | 0.2 ~17:1 |
| Proportion of Aromatic Impurity, percent. | 26 | 51 | 83 |

It is seen that although there is continuous improvement in the purity of the product, this improvement becomes proportionally smaller and the impurity becomes progressively more aromatic in character, the isoparaffin/naphthene impurities being proportionally reduced.

By removing the aromatics from the product before reprocessing a considerable improvement in purity is obtained as compared with simple reprocessing as indicated by the following example.

*Example*

A petroleum fraction boiling within the range 250 to 290° C. was treated with a 5 A. molecular sieve by the process described in co-pending application No. 3,965/61, the process conditions being as follows:

| Stage | Feedstock | Temperature, °C. | Pressure. p.s.i.g. | Rate | Duration, Minutes |
|---|---|---|---|---|---|
| Absorption | 250-290° C. Gas oil Nitrogen | 380 | 125 | 0.6 LHSV 120 GHSV | 6 |
| Purge | Nitrogen | | | 120 GHSV | 6 |
| Desorption | Normal Pentane | | | 1.0 LHSV | 12 |

The product obtained contained 97.7% weight n-paraffins and 0.7% weight aromatics. This product was washed with 4 x 2½ x vol. of 25% $SO_3$ oleum to remove the aromatics yielding a dearomatized product containing 98.4 n-paraffins and 1.6% isoparaffins and naphthenes. This material was then reprocessed with a 5 A. sieve under the same conditions as previously and a n-paraffin fraction containing 99.9% weight of n-paraffins was obtained.

We claim:

1. A process for the production of n-paraffin fractions having a purity of at least 99% by weight comprising contacting a petroleum fraction boiling in the $C_{10}$–$C_{20}$ range with a 5 A. molecular sieve at a temperature in the range 300–450° C. and at a pressure of 0–300 p.s.i.g. to produce an intermediate product containing at least 95%, by weight, of n-paraffins, subjecting the intermediate product to a dearomatization operation, contacting the dearomatized intermediate product with a 5 A. molecular sieve at a temperature in the range 300–450° C. and at a pressure of 0–300 p.s.i.g. to produce a fraction containing less than 1.0% by weight of isoparaffins and naphthenes, and recovering a n-paraffin product therefrom having a purity of at least 99%.

2. A process as claimed in claim 5 wherein the dearomatization is carried out by oleum washing.

3. A process as claimed in claim 5 wherein the dearomatization is carried out by adsorption on silica gel.

4. A process for the production of n-paraffin fractions having a purity of at least 99% by weight comprising contacting a petroleum fraction boiling in the $C_{10}$–$C_{20}$ range with a 5 A. molecular sieve at a temperature in the range 300–450° C. and at a pressure of 0–300 p.s.i.g. to produce an intermediate product containing at least 95% by weight of n-paraffins, contacting the intermediate product with a 5 A. molecular sieve at a temperature in the range 300–450° C. and at a pressure of 0–300 p.s.i.g. to produce a low isoparaffin/naphthene fraction containing less than 1.0% by weight of isoparaffins and naphthenes, subjecting the low isoparaffin/naphthene fraction to a dearomatizing operation, and recovering a n-paraffin product therefrom having a purity of at least 99%.

5. A process as claimed in claim 4 wherein the dearomatization is carried out by volume washing.

6. A process as claimed in claim 4 wherein the dearomatization is carried out by adsorption on silica gel.

References Cited by the Examiner

UNITED STATES PATENTS

| | | | |
|---|---|---|---|
| 2,514,580 | 7/1950 | Hirschler | 260—666 |
| 2,530,300 | 11/1950 | Hirschler | 260—676 |
| 2,559,517 | 7/1951 | Hirschler | 260—676 |
| 2,914,591 | 11/1959 | Brown | 260—676 |
| 2,935,467 | 5/1960 | Fleck et al. | 260—671 |
| 2,938,864 | 5/1960 | Fleck et al. | 260—676 |
| 2,971,993 | 2/1961 | Kimberlin et al. | 260—676 |
| 2,988,502 | 6/1961 | Ricards et al. | 260—676 |
| 3,146,277 | 8/1964 | Haws et al. | 260—676 |

ALPHONSO D. SULLIVAN, *Primary Examiner.*